United States Patent [19]

Seymour

[11] Patent Number: 4,924,661
[45] Date of Patent: May 15, 1990

[54] CONSTANT CLEARANCE CONDITIONING ROLLS

[75] Inventor: Shaun A. Seymour, New Holland, Pa.

[73] Assignee: Ford New Holland, Inc., New Holland, Pa.

[21] Appl. No.: 266,618

[22] Filed: Nov. 3, 1988

[51] Int. Cl.$^5$ .................... A01D 43/10; A01D 82/00
[52] U.S. Cl. .......................................... 56/1; 56/16.4; 56/DIG. 1; 100/155 R
[58] Field of Search .......... 56/1, DIG. 1, 16.4, 56/14.1, 14.2; 130/5 B, 5 J; 100/70 A, 155 R

[56] References Cited

U.S. PATENT DOCUMENTS

| | | | |
|---|---|---|---|
| 1,308,376 | 7/1919 | Schlichten | 56/DIG. 1 |
| 2,535,485 | 12/1950 | Cover | 130/5 J |
| 3,284,875 | 11/1966 | Wood | 56/DIG. 1 |
| 3,479,805 | 11/1969 | Soteropulos | 56/1 |
| 3,488,929 | 1/1970 | Hale | 56/1 |
| 3,513,645 | 4/1966 | Garrett et al. | 56/1 |
| 4,127,979 | 12/1978 | Hoch | 56/1 |
| 4,446,678 | 5/1984 | Smith | 56/1 |
| 4,516,391 | 5/1985 | McLean | 56/16.4 |

Primary Examiner—Bruce M. Kisliuk
Attorney, Agent, or Firm—Larry W. Miller; Frank A. Seemar; Darrell F. Marquette

[57] ABSTRACT

A conditioning roll mechanism is disclosed for use on a mower-conditioner to provide uniform conditioning of crop material passing therebetween. Each conditioner roll is formed with a plurality of transversely extending lobes interspersed with corresponding troughs to provide an intermeshing configuration with the opposing conditioning roll. The configuration of the external surface of each conditioning roll permits the rolls to be mounted in a nominal working position in which a substantially uniform clearance is maintained between the conditioning rolls during rotation thereof to provide uniform conditioning of the entire crop material plant.

3 Claims, 6 Drawing Sheets

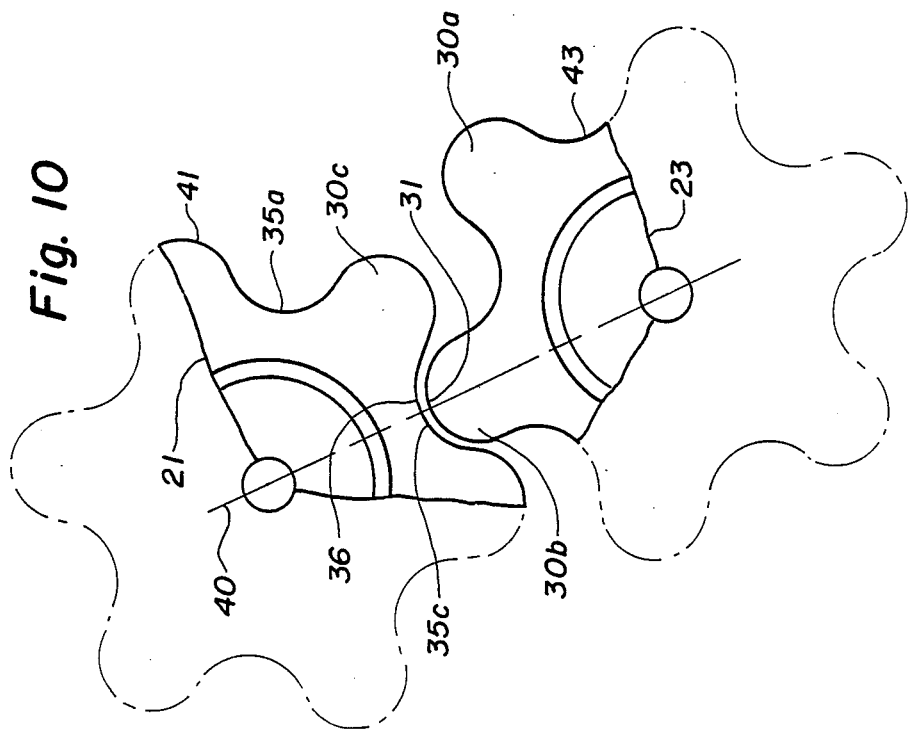

4,924,661

CONSTANT CLEARANCE CONDITIONING ROLLS

BACKGROUND OF THE INVENTION

The present invention relates generally to hay harvesting machinery commonly referred to as mower-conditioners and, more particularly, to a conditioning roll construction which will provide uniform conditioning of crop material passing between intermeshing conditioning rolls.

Mower-conditioners are typically provided with a crop gathering header including a crop cutting mechanism operable to sever standing crop material from the field and a conveying mechanism, such as a reel, to convey the severed crop material rearwardly into a conditioning mechanism. One type of conditioning apparatus is in the form of a pair of counterrotating conditioning rolls mounted generally vertically to receive crop material therebetween and condition the crop material by crushing the plants to permit moisture to escape.

Conditioning rolls of the type disclosed in U.S. Pat. No. 3,488,929 and in U.S. Pat. No. 3,513,645 are constructed with a plurality of square-shaped lugs intermeshing with corresponding recesses in the opposing conditioning roll to crush and crimp crop material passing therebetween upon rotation of the conditioning mechanism. These types of conditioning rolls are intended to crimp the crop material at spaced apart intervals to speed the drying process. Crops, such as alfalfa, include a waxy stem that can be dried more evenly and quickly if the stem is split uniformly along the length thereof to facilitate the drainage of moisture therein.

Typically, haying operations take place over a period of time encompassing several days during which the severed and conditioned crop material is laying on the ground to be dried and is, therefore, exposed to the elements, which can severely deteriorate the quality of the harvested crop, particularly when the crop is rained upon. The utilization of desiccants, a chemical such as potassium carbonate chemically hasten the drying process of the crop material, adds significant cost to the harvesting process and exposes the operator to significant problems with respect to handling the chemicals and with respect to the capital expense of providing equipment for applying it to the crop material.

Although many farmers have started using desiccants in their hay harvesting operation, it would certainly be prefereable to provide a mechanical means to hasten the drying process to permit the crop to be harvested in a shorter period of time without adding significant costs to the harvesting process.

SUMMARY OF THE INVENTION

It is an object of this invention to overcome the aforementioned disadvantages of the prior art by providing a conditioning mechanism that will provide a uniform conditioning of crop material.

It is another object of this invention to provide a conditioning mechanism for use on a mower-conditioner utilizing a pair of conditioning rolls having a configuration that will maintain a uniform clearance during rotation of the conditioning rolls.

It is a feature of this invention that the crop material passing between the conditioning rolls would be maintained under constant pressure for a uniform conditioning thereof.

It is an advantage of this invention that the uniform conditioning of the crop material will mechanically hasten the time for drying.

It is still another object of this invention to provide a configuration for a conditioning roll that, when rotated with a second corresponding conditioning roll, will provide a substantially constant clearance between the external surfaces thereof as measured along a line of pressure interconnecting the axes of rotation of the conditioning rolls.

It is another advantage of this invention that the drying time for harvesting hay can be shortened without the utilization of chemical drying agents.

It is another feature of this invention that the constant clearance conditioning rolls can be utilized in a standard mower-conditioner without modification thereto.

It is still another advantage of this invention that the conditioning rolls substantially uniformly condition the crop material passing therebetween along the entire length of the individual plant.

It is still another feature of this invention that substantially uniform conditioning of the crop material passing between the conditioning rolls can be obtained irrespective of the orientation of the individual plant passing between the conditioning rolls.

It is a further object of this invention to provide a conditioning mechanism for utilization in a mower-conditioner which is durable in construction, inexpensive of manufacture, carefree of maintenance, facile in assemblege, and simple and effective in use.

These and other objects, features and advantages are accomplished according to the instant invention by providing a conditioning roll mechanism for use on a mower-conditioner to provide uniform conditioning of crop material passing therebetween. Each conditioner roll is formed with a plurality of transversely extending lobes interspersed with corresponding troughs to provide an intermeshing configuration with the opposing conditioning roll. The configuration of the external surface of each conditioning roll permits the rolls to be mounted in a nominal working position in which a substantially uniform clearance is maintained between the conditioning rolls during rotation thereof to provide uniform conditioning of the entire crop material plant.

BRIEF DESCRIPTION OF THE DRAWINGS

The advantages of this invention will become apparent upon consideration of the following detailed disclosure of the invention, especially when taken in conjunction with the accompanying drawings wherein:

FIGS. 4-10 are schematic, diagrammatic views of the intermeshing conditioning rolls showing the rotation of one lobe, corresponding to 60 degrees of rotation of the conditioning rolls, each respective successive FIG. depicting the relative positions of the conditioning rolls after rotation of approximately 10 degrees beyond the preceeding FIG.

DETAILED DESCRIPTION OF THE PREFERRED EMBODIMENT

Figure 1:
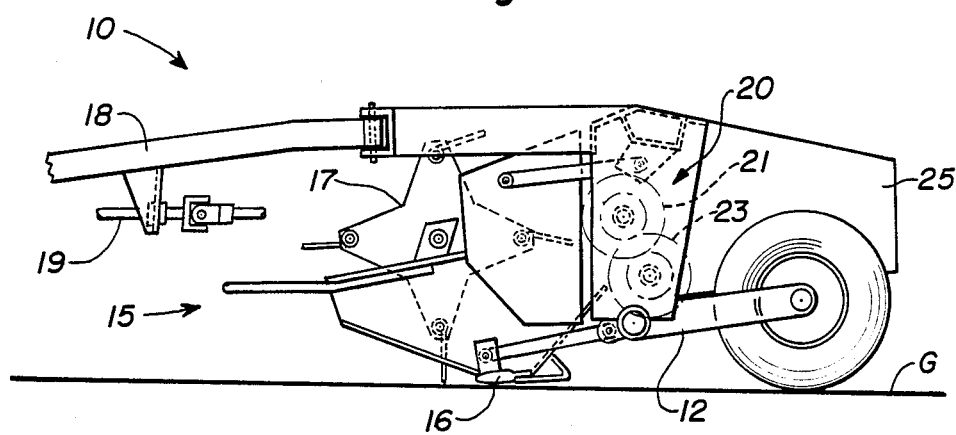
FIG. 1 is a side-elevational view of a mower-conditioner incorporating the principles of the instant invention.
Figure 2:
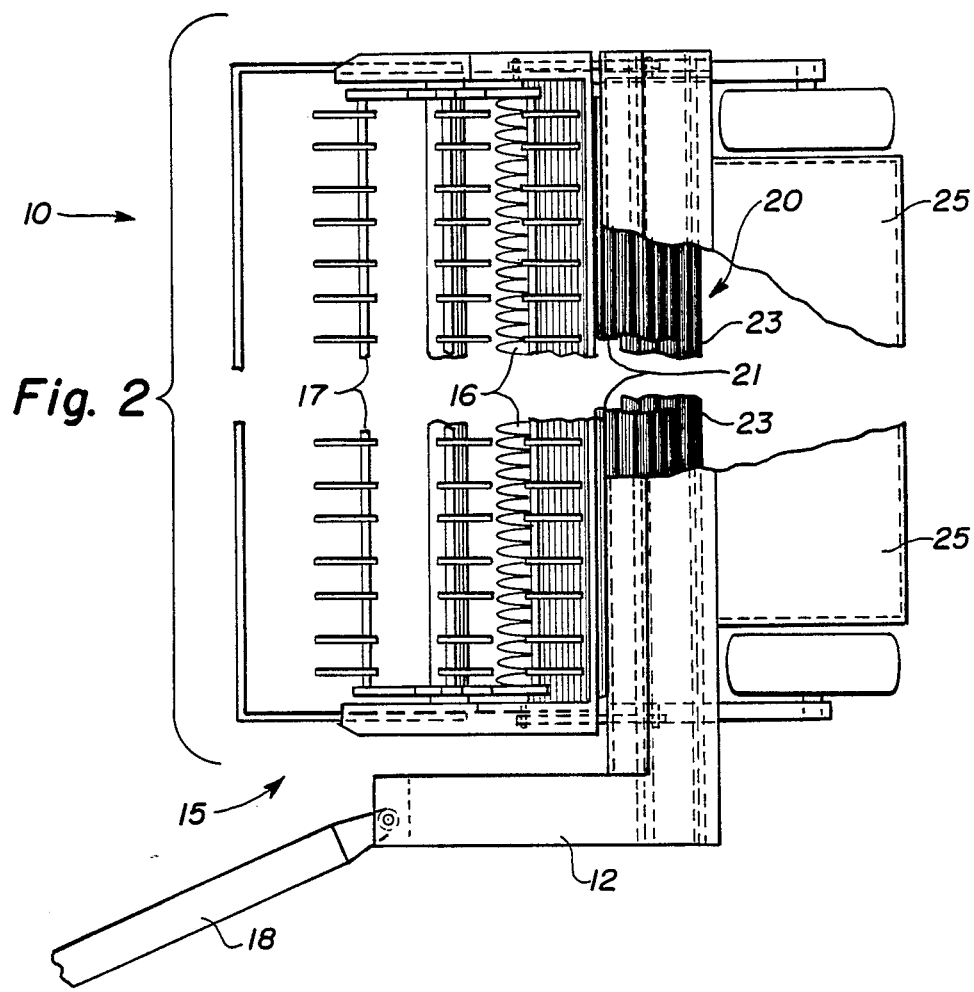
FIG. 2 is a top plan view of the mower-conditioner shown in FIG. 1 with the central portion thereof broken away.

Referring now to the drawings and, particularly, to FIGS. 1 and 2, a crop harvesting machine, commonly referred to as a mower-conditioner, incorporating the principles of the instant invention, can be seen. Any left and right references are used as a matter of convenience and are determined by standing at the rear of the machine, facing the forward end, looking in the direction of travel.

The crop harvesting machine 10, commonly referred to as a mower-conditioner, is provided with a wheeled frame 12 to permit mobile movement thereof over the ground G. The frame 12 pivotally supports a header 15 to provide flotational movement thereof relative to the ground G, as is well know in the art. The header 15 incorporates a transverse cutterbar 16 operable to severe standing crop material from the ground G and a reel 17 rotatable above the cutterbar 16 to convey the severed crop material rearwardly toward the conditioning mechanism 20. The mower-conditioner 10 is depicted as a pull-type implement having a drawbar 18 which is adapted for connection to a source of operative power such as a tractor (not shown). The drawbar 18 is pivotally connected to the frame 12 to provide a customary movement of the mower-conditioner 10 between transport and operative positions. The drawbar 18 also rotatably supports a drive line 19 typically connected to the power take-off shaft of the tractor (not shown) and provides a source of rotative power for operating the cutterbar 16, reel 17 and conditioning mechanism 20 in a manner well know in the art.

The conditioning mechanism 20 is located rearwardly of the reel 17 to receive severed crop therefrom for passage between an upper conditioning roll 21 and a lower conditioner roll 23 to effect a conditioning of the severed crop material to facilitate drying thereof. The discharge of the conditioned crop material from the conditioning mechanism 20 passes into a rearwardly positioned windrow shield 25 which can be positioned to deposit the conditioned crop material in a windrow having a width smaller than the transverse width of the cutterbar 16.

The conditioning of the severed crop material usually effects a crushing or crimping of the crop material to provide a means for drainage of moisture from the plant. Conditioning rolls as found in U.S. Pat. No. 3,513,645 pinch the plant along regular intervals due to the interaction between the radially extending, intermeshing lugs on the opposing rolls. However, it would be desireable to completely crush the entire plant stalk so that moisture could more readily escape from the individual plant. FIGS. 3-10 depict a conditioning roll construction which will provide a uniform pressure on the crop material passing between the upper roll 21 and the lower roll 23. This uniform pressure is attained by an intermeshing roll structure that will maintain a constant clearance between the intermeshing rolls so that the crop material passing therebetween will be uniformly conditioned along the entire length of the plant irrespective of the orientation at which the plant enters the conditioning mechanism 20.

Figure 3:
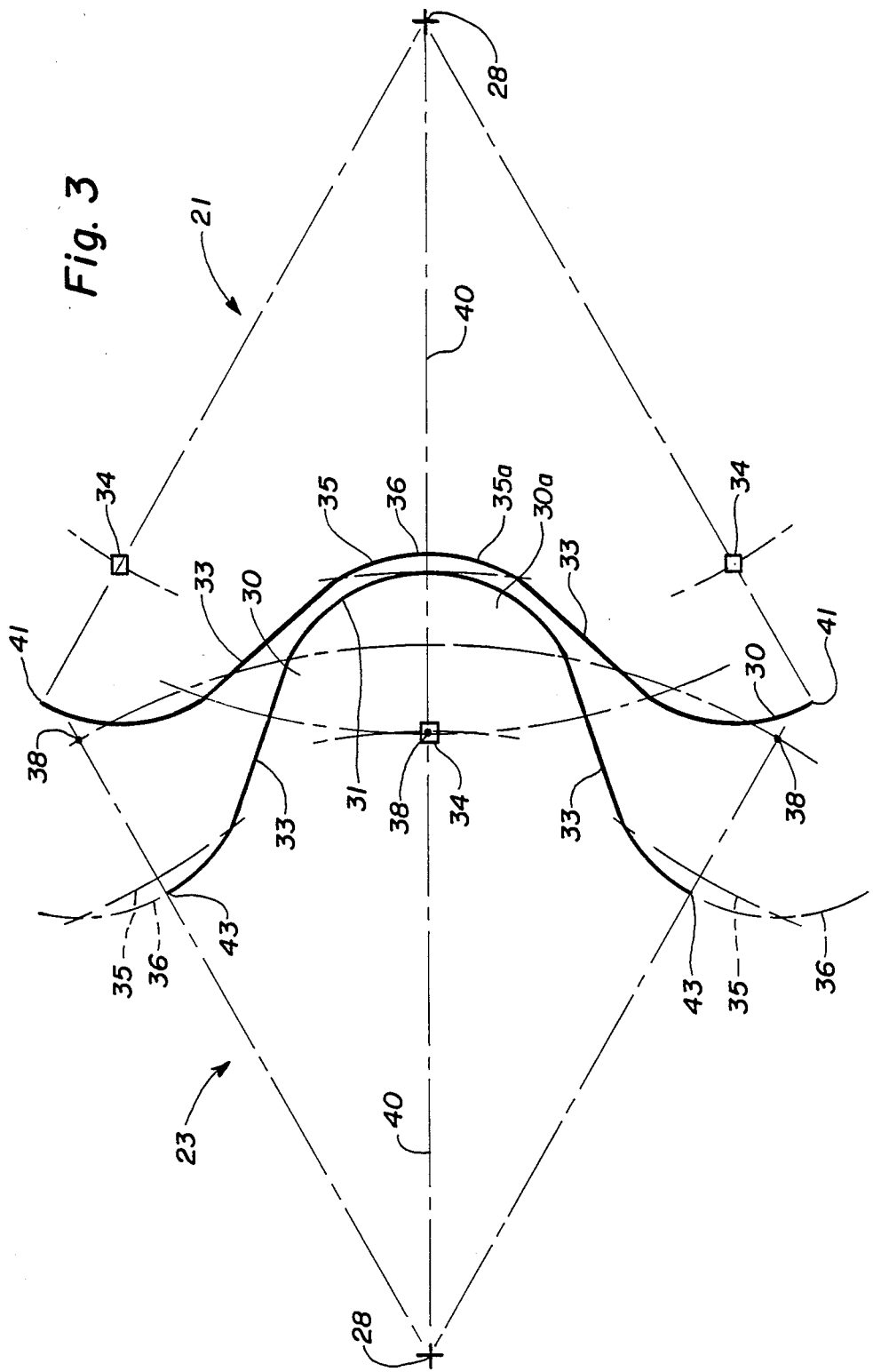
FIG. 3 is a schematic representation of a portion of the two intermeshing conditioning rolls showing the relationship between a lobe and a corresponding trough.

FIG. 3 depicts a portion of the profile of the intermeshing conditioning rolls 21, 23 positioned at a nominal working position at which the respective axes of rotation 28 is at a minimal allowable distance. The specific construction of the roll would include six lobes 30 equidistantly spaced around the conditioning roll 21, 23 and interspersed by corresponding troughs 35 therebetween. The segments of the conditioning rolls 21, 23 shown in FIG. 3 correspond to an angular segment of 60 degrees measured from the axes of rotation 28 of the conditioning rolls 21, 23.

Each lobe 30 has a circular arc 31 forming the tip of the lobe 30. The center of curvature of the circular arc 31 is indicated by the box 34. Each trough 35 is also provided with a circular arc 36 at the bottom of the trough 35 to correspond to the tip of the corresponding intermeshing lobe 30. The center of curvature of the circular arc 36 is indicated by the dot 38. The circular arcs 31, 36 on each respective conditioning rolls 21, 23 are interconnected by an arcuate segment having a variable radius of curvature, generally defined as a spiral. As can be seen in FIG. 3, when the center of curvature 34 of the arc 31 of the lobe 30 crosses the line 40 interconnecting the axes of rotation 28 of the upper conditioning roll 21 and the lower conditioning roll 23, the center of curvature 38 of the arc 36 of the corresponding trough 35 coincides with the center of curvature 34.

The exerting of conditioning pressure between the conditioning rolls 21, 23 on the crop material passing therebetween is directed along the line 40 interconnecting the axes of rotation 28 of the conditioning rolls 21, 23. Accordingly, to maintain a constant uniform pressure on the crop material passing between the conditioning rolls 21, 23, the clearance between the exterior peripheries 41, 43, respectively of the conditioning rolls 21, 23, should be maintained substantially constant. Referring now to FIGS. 4-10, a rotation of the conditioning rolls through 60 degrees, which the center of one lobe 30a to the center of the adjacent lobe 30b, can be seen. The clearance between the peripheries 41, 43 measured along the line 40 remains substantially constant.

Figure 5:
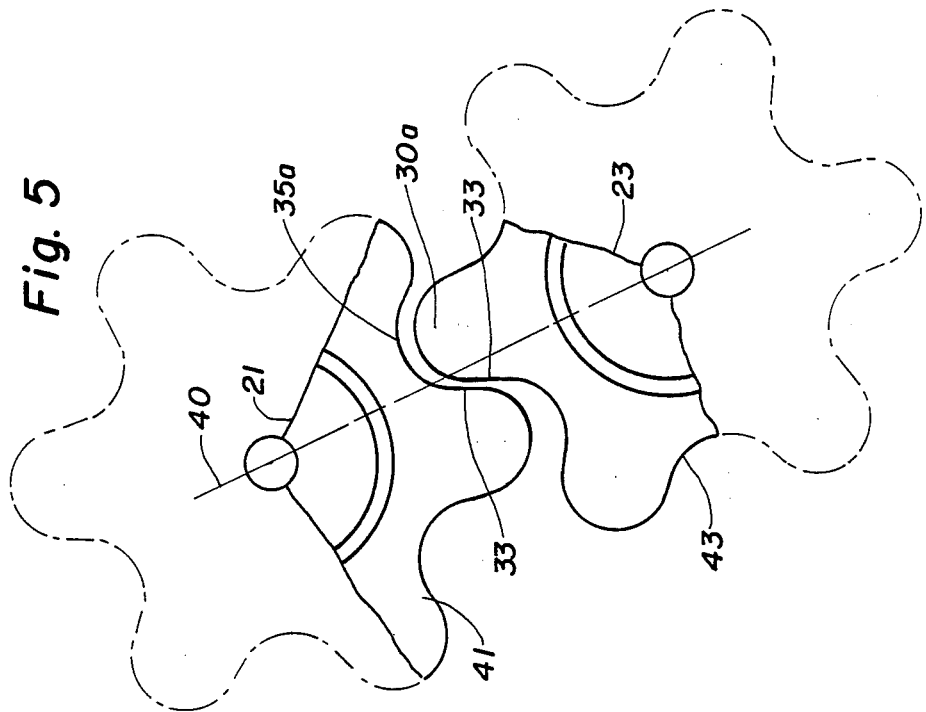
Figure 4:
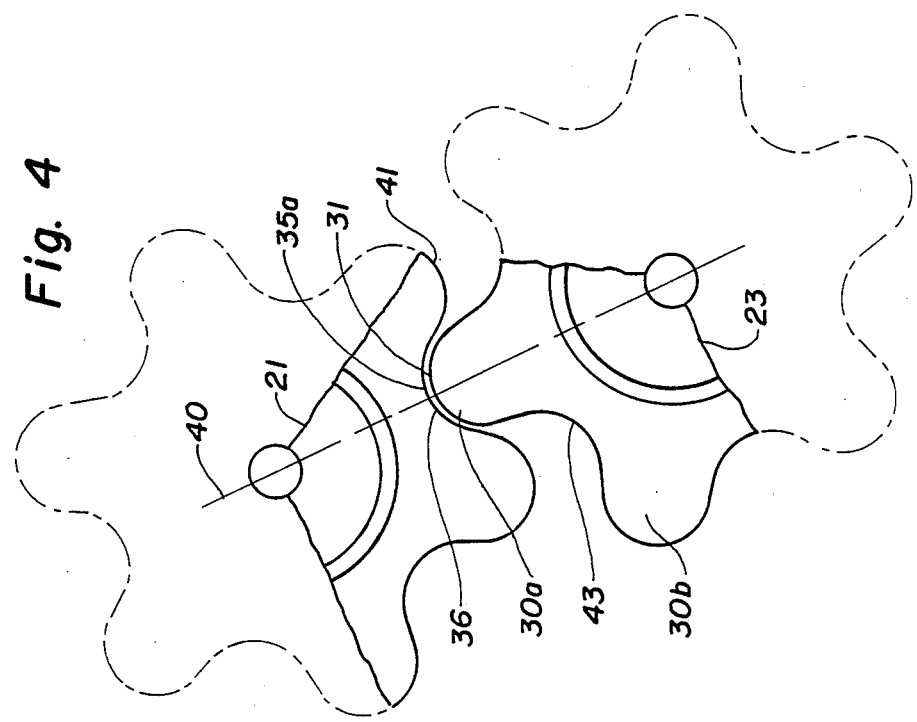

Referring first to FIG. 4, the orientation of the conditioning rolls is in line with that depicted in FIG. 3, the center of curvature 34 of the lobe 30a and the center of curvature 38 of the trough 35a are aligned with the line 40 and the clearance along the entire circular arcs 31, 36 is constant. FIG. 5 depicts a rotation of approximately 10 degrees to a position where the line of pressure 40 is exerted through the spiral portions interconnecting the respective arcs 31, 36, with the clearance between the periphery 41 of the roll 21 and the periphery 43 of the roll 23 remaining substantially constant.

Figure 6:
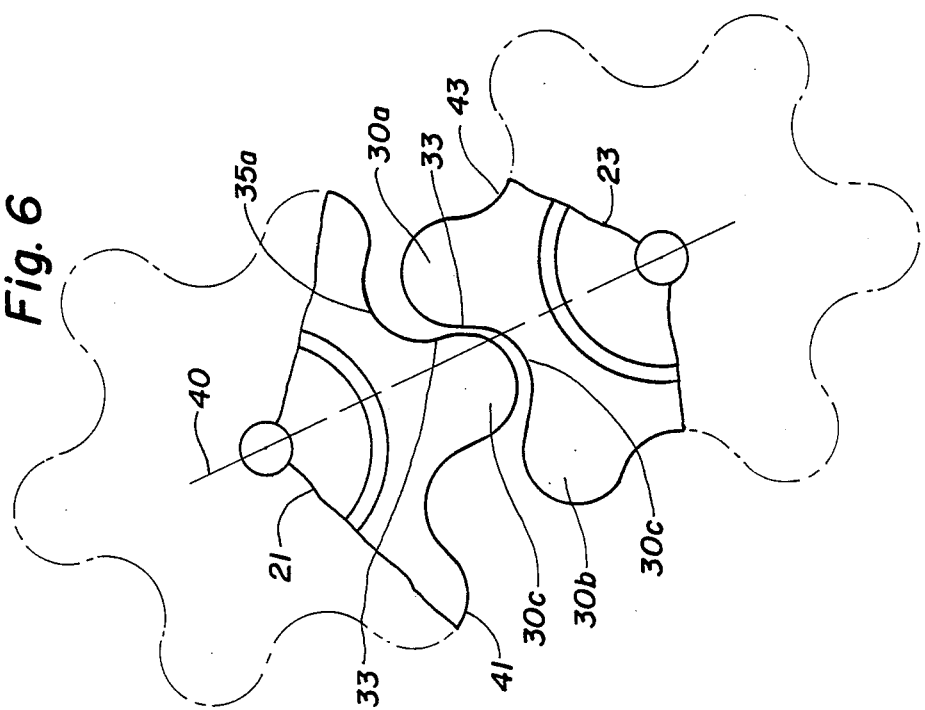

Referring now to FIG. 6, a further rotation of approximately 10 degrees has transpired and the lobe 30c on the upper roll 21 is beginning to align with the corresponding trough 35c on the lower conditioning roll 23. Again, the clearance between the peripheries 41, 43 remains substantially constant, maintaining a uniform conditioning pressure on the crop material passing therebetween.

Figure 7:
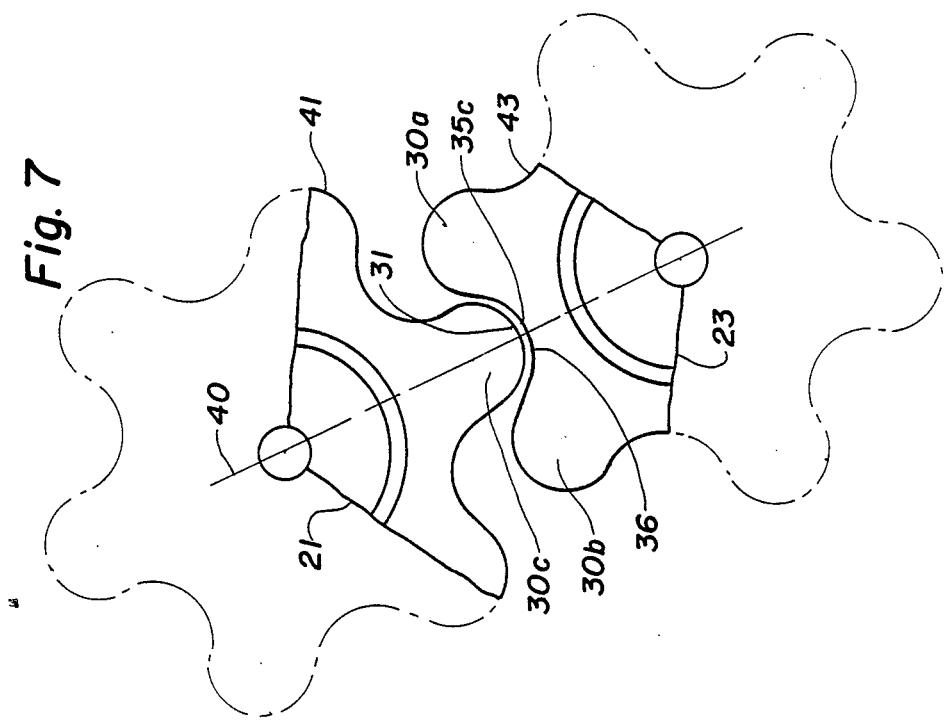
Figure 8:
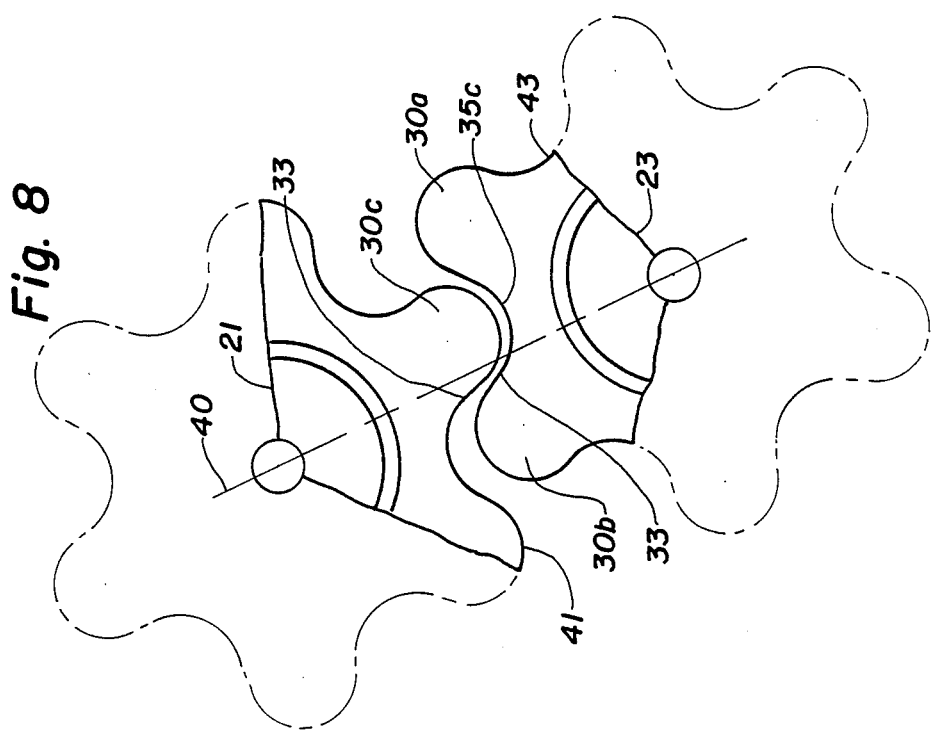

Referring now to FIG. 7, an additional 10 degrees of rotation has occurred aligning the lobe 30c with the trough 35c, the clearance between the circular arcs 31, 36 being identical to the clearance between those corresponding respective arcs for lobe 30a and trough 35a. After another 10 degrees of rotation, as depicted in FIG. 8, the spiral portions interconnecting the respective circular arcs 31, 36 on the adjacent lobes and troughs again pass through the line of force 40, while the clearance between the respective peripheries 41, 43 remains substantially constant.

Figure 9:
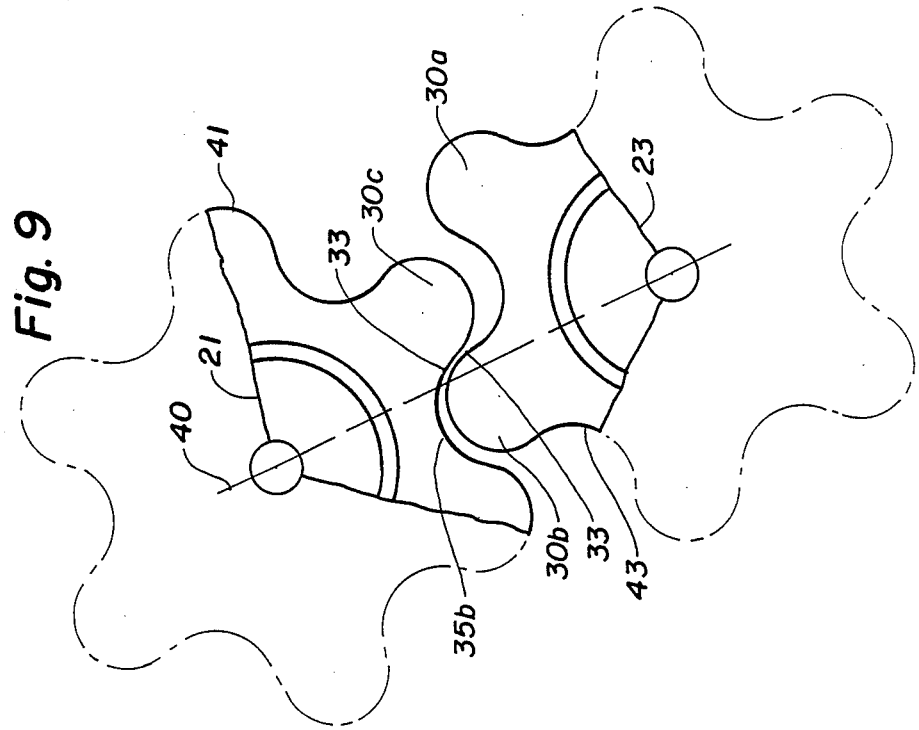

Similar to that depicted in FIG. 6 above, FIG. 9 shows an additional 10 degrees of rotation with the lobe 30b on the lower conditioning roll 23 beginning to align with the corresponding trough 35b on the upper conditioning roll 21. As before, the clearance between the respective peripheries 41, 43 remains substantially constant. Finally, referring to the schematic representation of FIG. 10, the lobe 30b has aligned with the trough 35b with the clearance between the respective circular arcs 31, 36 being the same as with lobes 30a, 30c and respective troughs 35a, 35c. Since FIG. 10 is essentially identical to FIG. 4, further rotation of the conditioning rolls 21, 23 will pass through the same sequence as shown in FIGS. 4-10.

As is common with mower-conditioners of the type shown in FIGS. 1 and 2, the upper roll 21 is typically mounted for movement relative to the lower conditioner roll 23 to facilitate the passage of slugs of crop material and/or foreign matter without damaging the mounting structure of the conditioning mechanism 20. Even though the upper roll 21 may move relative to the lower roll, causing an increase in distance between the respective axes of rotation 28, the clearance between the respective peripheries 41, 43 remains constant for any given distance between the respective axes of rotation 28. The resultant conditioning of the crop material passing between these conditioning rolls 21, 23 will be uniform without intermittent crimping along intervals of the individual plant.

Furthermore, a plant entering between the conditioning rolls 21, 23 in a transverse orientation will also be subjected to the same constant conditioning pressure as a plant passing longitudinally between the conditioning rolls 21, 23, resulting in a uniform conditioning of the crop material irrespective of the orientation at which it passes between the conditioning rolls 21, 23. With the aforementioned prior art conditioning devices, a plant passing between the rolls in a transverse orientation may completely miss being conditioned.

It will be understood that changes in the details, materials, steps and arrangements of parts which have been described and illustrated to explain the nature of the invention will occurr to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention what is claimed is:

1. In a mower-conditioner having a mobile frame adapted for movement over a field; a crop gathering means supported from said frame to collect crop material from the field and convey the collected crop material rearwardly; a pair of opposing conditioning rolls rotatably supported by said frame rearwardly of said crop gathering means to receive said collected crop material and effect a conditioning of said collected crop material by the passage thereof between said rotating conditioning rolls, and power means for operatively powering said crop gathering means and said conditioning rolls, the improvement comprising:

each said conditioning roll is constructed with a convoluted exterior surface defining a plurality of radially outwardly extending lobes and corresponding troughs between the respective said lobes, said lobes and said troughs being configured such that the distance between the respective exterior surfaces of said opposing conditioning rolls as measured along a line of pressure interconnecting the axes of rotation of said conditioning rolls is substantially constant during the rotation of said conditioning rolls to effect a substantially uniform conditioning of said collected crop material passing between said opposing conditioning rolls, the exterior surface of each said conditioning roll being arcuate to define a mating surface with the opposing conditioning roll so that the lobes on the respective opposing conditioning rolls intermesh during rotation thereof, at least a portion of the arc defining each respective said lobe having a constant radius from a first center of curvature, at least a portion of the arc defining each said trough having a constant radius from a second center of curvature, the constant radius portion of each said lobe being connected to the constant radius portion of each adjacent trough by an arcuate surface having a variable radius of curvature.

2. The mower-conditioner of claim 1 wherein the lobes extend linearly relative to the circumference of the respective conditioning roll and are oriented transversely to the flow of collected crop material passing therebetween.

3. The mower-conditioner of claim 1 wherein said conditioning rolls are mounted for positioning at a nominal working position at which the distance between the respective axes of rotation of said conditioning rolls provides a first distance between the respective exterior surfaces of said conditioning rolls as measured along said line of pressure interconnecting said respective axes of rotation, said first center of curvature coinciding with the corresponding said second center of curvature when said corresponding first and second centers of curvature intersect said line of pressure.

* * * * *